United States Patent
Liu et al.

(10) Patent No.: US 9,725,614 B2
(45) Date of Patent: Aug. 8, 2017

(54) CONDUCTIVE INK COMPOSITIONS AND METHODS FOR PREPARATION OF STABILIZED METAL-CONTAINING NANOPARTICLES

(71) Applicant: XEROX CORPORATION, Norwalk, CT (US)

(72) Inventors: Ping Liu, Mississauga (CA); Mahya Mokhtari, Toronto (CA); Tila Tahmoures-Zadeh, Thornhill (CA); Roger Gaynor, Oakville (CA); Yiliang Wu, Mississauga (CA); Nan-Xing Hu, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 181 days.

(21) Appl. No.: 13/866,704

(22) Filed: Apr. 19, 2013

(65) Prior Publication Data
US 2014/0312284 A1  Oct. 23, 2014

(51) Int. Cl.
- *C09D 11/52* (2014.01)
- *H01B 1/02* (2006.01)
- *B82Y 40/00* (2011.01)
- *B82Y 30/00* (2011.01)

(52) U.S. Cl.
CPC .............. *C09D 11/52* (2013.01); *B82Y 30/00* (2013.01); *B82Y 40/00* (2013.01); *H01B 1/02* (2013.01)

(58) Field of Classification Search
CPC .................... H01B 1/22; H01B 1/02

USPC ......................................................... 252/514
See application file for complete search history.

(56) References Cited

U.S. PATENT DOCUMENTS

| | | | |
|---|---|---|---|
| 7,270,694 B2* | 9/2007 | Li | B22F 1/0018 75/351 |
| 7,977,240 B1* | 7/2011 | Rockenberger et al. | 438/674 |
| 8,021,580 B2* | 9/2011 | Ueda et al. | 252/513 |
| 2003/0110978 A1* | 6/2003 | Abe et al. | 106/31.13 |
| 2008/0003363 A1* | 1/2008 | Park | B22F 1/0059 427/256 |
| 2008/0166543 A1* | 7/2008 | Zhuo | C09J 5/06 428/323 |
| 2009/0029148 A1* | 1/2009 | Hashimoto | B01J 13/0043 428/323 |
| 2010/0239750 A1* | 9/2010 | Breton | C09D 11/52 427/99.4 |
| 2012/0043512 A1* | 2/2012 | Liu | B41M 3/006 252/519.21 |

* cited by examiner

*Primary Examiner* — William Young
(74) *Attorney, Agent, or Firm* — MH2 Technology Law Group LLP (57) ABSTRACT

Processes for preparing stabilized metal-containing nanoparticles comprising silver and/or a silver alloy composite by reacting a silver compound with a reducing agent comprising a hydrazine compound at a temperature between about 20° C. and about 60° C. The reaction being carried out by incrementally adding the silver compound or a mixture of the silver compound and a stabilizer to a solution comprising the reducing agent, a stabilizer, and a solvent. Conductive ink compositions containing stabilized metal-containing nanoparticles prepared by such processes.

14 Claims, 1 Drawing Sheet

CONDUCTIVE INK COMPOSITIONS AND METHODS FOR PREPARATION OF STABILIZED METAL-CONTAINING NANOPARTICLES

BACKGROUND

Embodiments herein relate generally to methods of preparing stabilized metal-containing nanoparticles and conductive ink compositions containing stabilized metal-containing nanoparticles prepared by such methods. Certain embodiments are drawn to methods that can result in increased yields of stabilized metal-containing nanoparticles having good dispersibility in organic solvents and suitable for use in fabrication of electronic features having high conductivity.

Solution processable conducting materials including, for example, silver nanoparticles have come to play an important role in the electronics industry in recent years. Solution processable metal-containing nanoparticles can be used to fabricate conducting features in electronic devices (such as, electrodes and electrical interconnectors, among others) by low-cost solution deposition and patterning techniques. However, there have been challenges in synthesizing high quality, solution processable conducting materials (such as, silver nanoparticles) on a large scale.

It would be desirable to have processes for the production of solution processable conducting materials of consistent quality that could be performed on a scale suitable for commercial manufacturing.

SUMMARY

Certain embodiments are drawn to conductive ink compositions containing stabilized metal-containing nanoparticles comprising silver and/or a silver alloy composite. The stabilized metal-containing nanoparticles are dispersed in at least one ink vehicle to form such conductive ink compositions. The stabilized metal-containing nanoparticles are prepared by reacting a silver compound with a reducing agent including a hydrazine compound by incrementally adding the silver compound or a mixture of the silver compound and a stabilizer to a first mixture of (a) the reducing agent, (b) a stabilizer including an organoamine, and (c) a solvent.

Some embodiments disclosed herein are drawn to processes for preparing stabilized metal-containing nanoparticles that contain silver and/or a silver alloy composite. The processes include reacting a silver compound and/or a silver complex with a reducing agent at a temperature between about 20° C. and about 60° C. The reaction is carried out by incrementally adding the silver compound or a mixture of the silver compound and a stabilizer to a solution containing (a) the reducing agent, which includes a hydrazine compound, (b) a stabilizer, which includes an organoamine, and (c) a solvent.

Certain embodiments are drawn to processes for producing stabilized silver nanoparticles that include (a) providing a mixture of a reducing agent, a stabilizer, and a solvent; and (b) (i) incrementally adding a silver compound to the mixture or (ii) incrementally adding a complex comprising a silver compound and an organoamine stabilizer to the mixture, wherein the temperature of the mixture is maintained below about 60° C., and wherein a soluble silver ion concentration remains low in the mixture.

DETAILED DESCRIPTION

Certain embodiments can be better understood with reference to the Drawings.

Figure 1A:
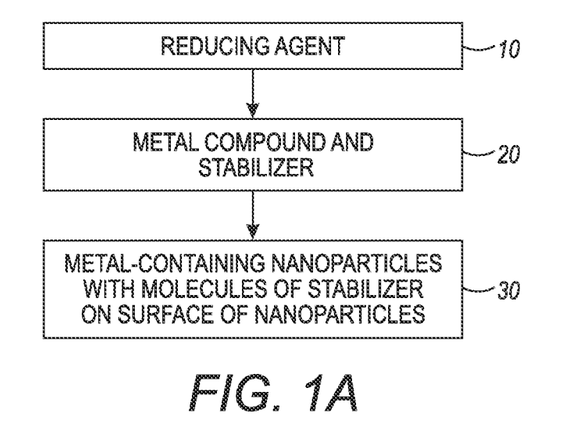
FIG. 1A is a scheme for a known method of preparing stabilized metal-containing nanoparticles and FIG. 1B is a scheme illustrating certain embodiments disclosed herein.

A known scheme for producing stabilized metal-containing nanoparticles (such as, stabilized silver nanoparticles, among others) 30 is shown in FIG. 1A. In such methods known in the art, a reducing agent 10 is added to a reaction mixture 20. The reaction mixture 20 contains a metal compound and a stabilizer. Upon addition of the reducing agent 10 to the reaction mixture 20, the metal compound reacts with the reducing agent to form metal-containing nanoparticles with a surface-coating of stabilizer 30 on each nanoparticle. The reaction as carried out in the known scheme as shown in FIG. 1A requires an elevated temperature of about 40° C. to 50° C. to dissolve the mixture of silver compound, stabilizer, and the solvent in the reaction container before adding the reducing agent. Thus, the reaction temperature increases to a higher temperature over 55° C. easily during the addition of the reducing agent including a hydrazine compound since the reduction process is a highly exothermic reaction. One of the advantages of the invention over the current methods as the reaction temperature can be easily controlled at a favorable range of about 20° C. to about 60° C. or about 30° C. to about 55° C.

As an example, stabilized silver nanoparticles have been synthesized following a known scheme as illustrated in FIG. 1A by the addition of a reducing agent including phenylhydrazine to a mixture containing silver acetate and a stabilizer including at least one organic amine. Although the silver nanoparticles produced by this known method are conductive and solution processable, successfully scaling up the process to meet practical industrial applications (requiring consistent quality and high yields of stabilized silver nanoparticles) has proved difficult.

Figure 1B:
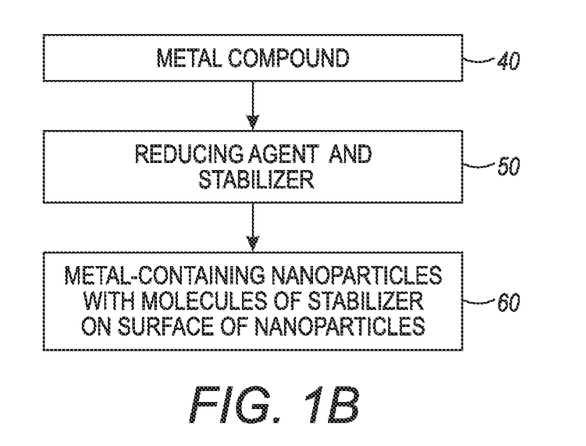

In contrast to the known scheme illustrated in FIG. 1A, a scheme illustrating certain embodiments are shown in FIG. 1B. In FIG. 1B, stabilized metal-containing nanoparticles 60 are prepared by adding a metal compound or a mixture of a metal compound and a stabilizer (e.g., a silver compound or a mixture of a silver compound and a stabilizer) 40 to a reaction mixture 50. The reaction mixture 50 contains a reducing agent, a stabilizer and solvents. Upon addition of the metal compound or the mixture of the metal compound and the stabilizer 40 to the reaction mixture 50, the metal compound reacts with the reducing agent to form the stabilized metal-containing nanoparticles 60. In some embodiments, the reducing agent can include a hydrazine compound and the stabilizer can comprise an organoamine. The reaction of the metal compound with the reducing agent can be carried out at a temperature between about 20° C. and about 60° C.

As discussed in greater detail below, embodiments following a scheme as illustrated in FIG. 1B can produce stabilized metal-containing nanoparticles with improved solution solubility as compared to scheme following a process known in the art as illustrated in FIG. 1A. The nanoparticles prepared with the new process disclosed can have lower silver content or higher stabilizer content in the dry powder measured by the ash method, indicating the nanoparticles can be better stabilized with a stabilizer, such as an organoamine. Such nanoparticles can provide better solution solubility, higher yield for conductive ink preparations, higher ink conductivity, and better ink jettability.

The scheme of embodiments illustrated in FIG. 1B can have several advantages over the scheme known in the art illustrated in FIG. 1A. The reduction reaction of embodiments shown in FIG. 1B can be carried out at much lower temperatures without gelling or solidification of the reaction mixture. Thus, a process within the scope of the known scheme in FIG. 1A involves a reaction mixture 20 containing silver acetate and an organoamine (as a stabilizer) and easily forms complex chemical networks in most organic solvent systems during the reduction reaction. The reaction mixture 20 can easily gel or solidify depending on the reaction temperature used and presents an obstacle to processing at lower temperature ranges. In contrast, an embodiment within the scope of the scheme in FIG. 1B (and described in greater detail herein) including silver acetate and organoamine stabilizer can eliminate gelling of silver acetate and organoamine in a reaction container during the reaction, as silver acetate or a mixture of silver acetate and organoamine is gradually/incrementally added to a reaction mixture 50 containing organoamine stabilizer and reducing agent in one or more solvents.

In some embodiments disclosed herein, the exothermic reduction of a metal compound (e.g., silver acetate) by a reducing agent (e.g., phenylhydrazine) can more easily be controlled at lower temperature ranges (for example between about 20° C. and about 55° C.) without concern that there will be gelling, as in methods falling within the scheme known in the art shown in FIG. 1A. The quality of metal-containing nanoparticles produced by schemes known in the art as in FIG. 1A is dependent on the length of time over which a reducing agent 10 is added to the reaction mixture 20 in one or more solvents. In comparison, embodiments as in FIG. 1B can yield metal-containing nanoparticles having improved nanoparticle size (such as, more uniform size distribution), conductivity, and processability for use in conductive ink compositions. The improved properties of the metal-containing nanoparticles produced by an embodiment as in FIG. 1B are not significantly dependent on the length of time taken to add the metal compound or a mixture of the metal compound and a stabilizer 40 into the reaction mixture 50. Further, the yield of a conductive ink can be much higher when the metal-containing nanoparticles prepared by embodiments of FIG. 1B that are used for the ink preparations, compared with the ink yield when the metal-containing nanoparticles are prepared by known schemes of FIG. 1A that are used for the ink preparations.

Certain embodiments are drawn to processes for preparing stabilized metal-containing nanoparticles comprising silver and/or a silver alloy composite (e.g., stabilized silver nanoparticles, among others). The processes comprise reacting a silver compound with a reducing agent comprising a hydrazine compound at a temperature between about 20° C. and about 60° C.; about 25° C. and about 55° C.; about 30° C. and about 50° C.; or about 30° C. and about 45° C. The reaction can be carried out by incrementally adding the silver compound or a mixture of the silver compound and a stabilizer to a solution comprising (a) the reducing agent, (b) a stabilizer comprising an organoamine, and (c) a solvent or a mixture of solvents. In embodiments, the total mole ratio of the stabilizer to the silver compound in the reaction mixture can be in the range of about 1:1 to about 10:1. For example, the mole ratio of the stabilizer to the silver compound can be about 1 to about 1; about 3 to about 1; about 5 to about 1; or about 10 to about 1.

Some embodiments are drawn to processes for producing stabilized silver nanoparticles comprising (a) providing a mixture of a reducing agent, a stabilizer, and a solvent; (b) (i) incrementally adding a silver compound to the mixture and/or (ii) incrementally adding a complex comprising a silver compound to the mixture, wherein the temperature of the mixture can be maintained below about 60° C. but not limited as the mixture is reacted, and wherein the reaction mixture has a substantially constant silver ion concentration during the period of incrementally adding the silver compound and/or the complex comprising a silver compound (e.g., silver complex). In further embodiments, the silver ion concentration remains low in the reaction mixture. The silver complex (e.g., complex comprising a silver compound) may comprise a silver salt and an organoamine complex, for example silver carboxylate and an organoamine complex. This is in contrast to the process where a reducing agent is added to a mixture containing a silver compound, a solvent, where the silver ion concentration in the reaction mixture changes dramatically during the period of adding the reducing agent (very high at the beginning, and reduce to very low at the end of the addition of reducing agent). Without being limited by theory, the substantially constant silver ion concentration in the reaction mixture can be important in achieving a uniform particle size. The substantially constant silver ion concentration may be where the silver ion concentration varies by less than about 25%; less than about 15%; less than about 10%; less than about 5%; or less than about 3% during the reaction or during the period of incrementally adding a silver compound and/or silver complex.

The term "nano" as used in "metal-containing nanoparticles" refers to, for example, a particle size of less than about 100 nm, such as, for example, from about 0.5 nm to about 100 nm, from about 1 nm to about 50 nm, from about 1 nm to about 20 nm, from about 1 nm to about 15 nm, or from about 1 to about 10 nm. The particle size refers to the average diameter of the metal-containing particles, as determined by TEM (transmission electron microscopy) or other suitable method. Generally, a plurality of particle sizes can exist in the metal-containing nanoparticles obtained from the process described herein. In embodiments, the existence of different sized silver-containing nanoparticles is acceptable.

Metal-containing nanoparticles prepared by embodiments can have excellent solution processability and can be used in the fabrication of various electronic features requiring high conductivity. The stabilized metal-containing nanoparticles comprise (a) a metal nanoparticle core containing silver or silver-alloy composite and (b) a stabilizer surface coating. In some embodiments, the stabilized metal-containing nanoparticles can be organoamine stabilized silver nanoparticles. In embodiments, the stabilized metal-containing nanoparticles can have a metal content of at least about 65 weight percent, at least about 85 weight percent, or at least about 90 weight percent. The weight percentage of the metal in the stabilized metal-containing nanoparticle can be from, for example, about 40 weight percent to about 97 weight percent, about 65 weight percent to about 95 weight percent, about 80 to about 95 weight percent, or about 90 to about 95 weight percent.

In certain embodiments the silver compound can be selected from the group consisting of silver acetate, silver nitrate, silver oxide, silver acetylacetonate, silver benzoate, silver bromate, silver bromide, silver carbonate, silver chloride, silver citrate, silver fluoride, silver iodate, silver iodide, silver lactate, silver nitrite, silver perchlorate, silver phosphate, silver sulfate, silver sulfide, and silver trifluoroacetate. In some embodiments the silver compound used in preparing the metal-containing nanoparticles can be a silver salt selected from the group consisting of silver acetate, silver trifluoroacetate, silver halide, silver sulfate, silver nitrate, silver hydrocarbylsulfonate, and a mixture of two or more thereof. The silver compound can be silver acetate in certain embodiments. The silver compound or a mixture of silver compound or a mixture of silver compound and a stabilizer can be added to the solution containing the reducing agent, stabilizer and solvent as a component of a metal-containing solution or as a powder form. The silver compound can comprise silver or a silver alloy composite, and in certain embodiments the silver compound can optionally further comprise other metals or metal alloys. In some embodiments, the metal-containing solution or the powder, in addition to a silver compound, can comprise a metal selected from the group consisting of aluminum, gold, platinum, palladium, copper, cobalt, chromium, indium, nickel, and mixtures of two or more thereof. In certain embodiments, the metal-containing solution or the powder can comprise a composite selected from the group consisting of Au—Ag, Ag—Cu, Ag—Ni, Au—Cu, Au—Ni, Au—Ag—Cu, and Au—Ag—Pd. The metal-containing solution or powder comprising silver can also include non-metals, such as, for example, Si, C, and Ge, among others. During reaction, the silver compound (for example as part of a metal-containing solution or powder) can be added to the solution containing the reducing agent and stabilizer over a period of time ranging from about 1 minute to about 6 hours; from about 10 minutes to about 4 hours; or about 20 minutes to about 2 hours.

The stabilized metal-containing nanoparticles comprising a silver alloy composite can comprise a silver alloy composite selected from the group consisting of a silver-copper composite, a silver-gold-copper composite, silver-gold-palladium composite, and mixtures of two or more thereof. In certain embodiments, the stabilized metal-containing nanoparticles comprising silver and/or a silver alloy composite further comprise a metal selected from the group consisting of aluminum, gold, platinum, palladium, copper, cobalt, chromium, indium, nickel, and mixtures of two or more thereof. In some embodiments, the stabilized metal-containing nanoparticles comprising silver and/or a silver alloy composite further comprise gold, platinum, palladium, copper, cobalt, chromium, nickel, or mixtures thereof. The stabilized metal-containing nanoparticles can comprise a composite selected from the group consisting of Au—Ag, Ag—Cu, Ag—Ni, Au—Cu, Au—Ni, Au—Ag—Cu, and Au—Ag—Pd, in certain embodiments. The stabilized metal-containing nanoparticles can also include non-metals, such as, for example, Si, C, and Ge, among others.

In embodiments, the reducing agent used in preparing the stabilized metal-containing nanoparticles comprises a hydrazine compound. The hydrazine compound can be selected from the group consisting of hydrazine or its corresponding salt, a hydrocarbylhydrazine, a hydrocarbylhydrazinium salt, a carbohydrazide, a semicarbazide, a sulfonohydrazide, or a mixture of two or more thereof. In some embodiments the hydrazine compound can be phenylhydrazine. The mole ratio of the reducing agent to silver compound can be in the range of 1:2.5 to 1:1.5, but not limited. For example, the mole ratio of the reducing agent to the silver compound can be about 1 to 2; about 1 to 1.98; or about 1 to 1.90.

In embodiments, the stabilizer can be physically or chemically associated with the surface of the metal-containing nanoparticles to yield stabilized metal-containing nanoparticles. The metal-containing nanoparticles with the stabilizer thereon (stabilized metal-containing nanoparticles) can be isolated and recovered from a reaction mixture used in forming the nanoparticle and stabilizer complex. The stabilized metal-containing nanoparticles can thus be subsequently readily and homogeneously dispersed in an ink vehicle for forming a conductive ink composition (printable solution).

As used herein, the phrase "physically or chemically associated" between the metal-containing nanoparticles and the stabilizer can be a chemical bond and/or other physical attachment. The chemical bond can take the form of, for example, covalent bonding, hydrogen bonding, coordination complex bonding, or ionic bonding, or a mixture of different chemical bonds. The physical attachment can take the form of, for example, van der Waals' forces or dipole-dipole interaction, or a mixture of different physical attachments.

The stabilizer comprises an organoamine. The stabilizer can be an organoamine stabilizer such as those described in U.S. Pat. No. 7,270,694, which is incorporated by reference herein in its entirety. The organoamine can comprise a hydrocarbylamine having at least 4 carbon atoms, in some embodiments. The organoamine can be selected from the group consisting of butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine and mixtures of two or more thereof. The stabilizer can be dodecylamine in some embodiments. In certain embodiments, the reducing agent can be a phenylhydrazine and the stabilizer can be dodecylamine.

In some embodiments, the organoamine can be selected from the group consisting of propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, methylpropylamine, ethylpropylamine, propylbutylamine, ethylbutylamine, ethylpentylamine, propylpentylamine, butylpentylamine, triethylamine, tripropylamine, tributylamine, tripentylamine, trihexylamine, triheptylamine, trioctylamine, 1,2-ethylenediamine, N,N,N',N'-tetramethylethylenediamine, propane-1,3-diamine, N,N,N',N'-tetramethylpropane-1,3-diamine, butane-1,4-diamine, N,N,N',N'-tetramethylbutane-1,4-diamine, and mixtures of two or more thereof.

The extent of the coverage of stabilizer on the surface of the metal-containing nanoparticles can vary, for example, from partial to full coverage depending on the capability of the stabilizer to stabilize the metal-containing nanoparticles. Of course, there is variability as well in the extent of coverage of the stabilizer among the individual metal-containing nanoparticles. In embodiments, the coverage can be sufficient to increase dispersibility/stability of the metal-containing nanoparticles in an ink vehicle/organic solvent, as compared to the same metal-containing nanoparticles without a stabilizer.

The weight percentage of the organic stabilizer in the stabilized metal-containing nanoparticles (including only the metal nanoparticle and the stabilizer) can be from, for example, about 3 weight percent to about 60 weight percent, from about 5 weight percent to about 35 weight percent, from about 5 weight percent to about 20 weight percent, or from about 5 weight percent to about 10 weight percent.

The solvent component of the reaction containing the reducing agent, silver compound, and the stabilizer can be a mixture of two types of solvents. The first type of organic solvent can be less polar than the second type of organic solvent. In some embodiments, the first type of organic solvent can be decalin and the second type of organic solvent can be methanol.

The first type of organic solvent can facilitate the dispersion of the stabilized metal nanoparticles formed during the reaction process. In embodiments, the polarity index (PI) of the first type of organic solvent can be about 3.0 or lower and it can be an organic hydrocarbon solvent containing from about 6 to about 28 carbon atoms, which may be substituted or unsubstituted, and can be an aliphatic or aromatic hydrocarbon. Exemplary hydrocarbons may include aliphatic hydrocarbons such as heptane, undecane, dodecane, tridecane, tetradecane, isoparaffinic hydrocarbons such as isodecane, isododecane, and commercially available mixtures of isoparaffins such as ISOPAR E, ISOPAR G, ISOPAR H, ISOPAR L and ISOPAR M (all the above-mentioned manufactured by Exxon Chemical Company), and the like; cyclic aliphatic hydrocarbons such as bicyclopropyl, bicyclopentyl, bicyclohexyl, cyclopentylcyclohexane, spiro[2,2]heptane, bicyclo[4,2,0]octanehydroindane, decahydronaphthalene (i.e., bicyclo[4.4.0]decane or decalin), and the like; aromatic hydrocarbons such as toluene, benzene, chlorobenzene, o-dichlorobenzene; and mixtures thereof.

In some embodiments, the first type of organic solvent can be a hydrocarbon selected from the group consisting of toluene, xylene, decalin, bicyclohexyl, and mixtures thereof. Toluene has a polarity index of 2.3-2.4; xylene has a polarity index of 2.4-2.5; an estimated polarity index of decalin and bicyclohexyl should be similar to the polarity index of cyclohexane (PI=0.2) and less than 0.5. In some embodiments, the first type of organic solvent can be decalin, which is also known as decahydronaphthalene and has the formula $C_{10}H_{18}$. The first type of solvent may also be a mixture of one, two, three or more solvents, which may be present at any suitable volume ratio or mass ratio.

The second type of organic solvent can be more polar than the first type of organic solvent. The second type of solvent can have a good solubility for the reducing agent. In embodiments, the polarity index of the second organic solvent can be higher than 3.0. Exemplary second solvents include an alcohol, ether, ketone, ester, methylene chloride (PI=3.4), and mixtures thereof. It should be noted that not all alcohols, ethers, ketones, and esters have a polarity index higher than 3.0. Exemplary alcohols include methanol (PI=5.1-6.6), ethanol (PI=5.2), n-propanol (PI=4.0-4.3), n-butanol (PI=3.9-4.0), isobutyl alcohol (PI=3.9), isopropyl alcohol (PI=3.9-4.3), 2-methoxyethanol (PI=5.7), and the like. Exemplary ethers include, tetrahydrofuran (THF) (PI=4.0-4.2), dioxane (PI=4.8) and the like. Exemplary ketones include acetone (PI=5.1-5.4), methyl ethyl ketone (PI=4.5-4.7), methyl n-propyl ketone (PI=4.5), methyl isobutyl ketone (PI=4.2), and the like. Exemplary esters include ethyl acetate (PI=4.3-4.4), methyl acetate (PI=4.4), n-butyl acetate (4.0), and the like. In certain embodiments, the second solvent can be selected from the group consisting of methanol, ethanol, n-propanol, isopropanol, n-butanol, isobutanol, methyl ethyl ketone, ethyl acetate, tetrahydrofuran, 1,4-dioxane, and mixtures thereof. In some embodiments, the second type of solvent can be methanol. The second type of solvent may also be a mixture of one, two, three or more solvents, which may be present at any suitable volume ratio or mass ratio.

The first type of solvent and second type of solvent may not be soluble with each other. In other words, the first and second types of solvent separate into two visually detectable phases when mixed together.

In some embodiments, the first type of organic solvent has a polarity index of 2.5 or lower, and the second type of organic solvent has a polarity index of 3.5 or higher. In other embodiments, the difference in the polarity index between the first solvent and the second solvent can be at least 2.0. In other words, the polarity index of the second solvent minus the polarity index of the first solvent can be 2.0 or greater.

In some embodiments, the component of the reaction solvent may contains only one of the first type of solvents or a mixture of the first type of solvents with polarity index (PI) of less than 3.

After the reaction is completed, an additional amount of the second type of solvent can be added to precipitate the organoamine-stabilized silver nanoparticles. Generally, the total amount of the second type of solvent in the final mixture can be greater than the amount of the first type of solvent in the final mixture; this encourages precipitation. In embodiments, the final volume ratio of the first type of solvent to the second type of solvent may be from about 1:2 to about 1:5.

The silver nanoparticles formed by the disclosed processes exhibit improved size uniformity and solubility. The yield of ink preparations comprising such nanoparticles can be significantly increased in various proper ink solvents. Low annealing temperatures can be used with nanoparticles produced according to the present disclosure without sacrificing conductivity. The stabilized metal-containing nanoparticles produced in certain embodiments can have an annealing point of lower than about 130° C.; lower than about 120° C.; or lower than about 110° C. In particular embodiments, the annealing temperature can be from about 60° C. to about 100° C. At the annealing point the stabilized metal-containing nanoparticles form a metal framework with a conductivity of at least about 1000 S/cm; at least about 2,000 S/cm; at least about 5,000 S/cm; at least about 10,000 S/cm; at least about 30,000 S/cm ($3.0 \times 10^4$ S/cm); at least 50,000 S/cm; or at least 100,000 S/cm.

Stabilized metal-containing nanoparticles produced by methods disclosed herein (such as, in FIG. 1B) can have an increased dispersibility, in various organic solvents, such as decalin, as compared to stabilized metal-containing nanoparticles prepared by a method (such as, in FIG. 1A) comprising providing a reaction mixture of silver compound and stabilizer, and adding reducing agent to the reaction mixture, where the silver compound, the stabilizer and the reducing agent in both methods are the same.

Some embodiments are drawn to conductive ink compositions comprising: (a) a plurality of stabilized metal-containing nanoparticles comprising silver and/or a silver alloy composite and a stabilizer surface coating, and (b) at least one ink vehicle, wherein the plurality of stabilized metal-containing nanoparticles are dispersed in the ink vehicle. The stabilized metal-containing nanoparticles are prepared by a first method comprising reacting a silver compound with a reducing agent comprising a hydrazine compound at a temperature between about 20° C. and about 60° C. by incrementally adding the silver compound or a mixture of the silver compound and a stabilizer to a first mixture comprising the reducing agent, a stabilizer comprising an organoamine, and a solvent. In certain embodiments the silver compound can be reacted with the reducing agent at a temperature between about 20° C. and about 55° C.; about 30° C. and about 50° C.; or about 30° C. and about 45° C. The conductive ink compositions described herein contain a stabilizer that can be associated with the surface of metal-containing nanoparticles and in some embodiments, the stabilizer may not be removed until annealing of the metal-containing nanoparticles during formation of metal features on a substrate.

The stabilized metal-containing nanoparticles in the conductive ink compositions can be as described above and prepared by methods as described herein (such as encompassed by schemes of FIG. 1B). In embodiments the conductive ink composition can comprise greater than about 15 weight percent, greater than about 25 weight percent, greater than about 30 weight percent, or greater than about 35 weight percent silver. The stabilized metal-containing nanoparticles can be present in an amount of from about 10 to about 90 percent by weight of the total weight of the conductive ink composition, from about 20 to about 60 percent by weight of the total weight of the conductive ink composition, or from about 30 to about 50 percent by weight of the total weight of the conductive ink composition.

The stabilized metal-containing nanoparticles used as components of conductive ink compositions of embodiments can have a stability (that is, the time period where there is minimal precipitation or aggregation of the metal-containing nanoparticles in the composition) of, for example, from about one week to about 1 month, from about 1 week to about 2 months, from about 1 week to 3 months, from about 1 week to over 1 year. The stability can be monitored using a variety of methods, for example, a dynamic light scattering method that probes the particle size, a simple filtration method using a determined filter pore size, for example 1 micron, to evaluate the solid on the filter or solid remained in the ink after filtration by ash.

In embodiments, any suitable solvent having a polarity index (PI) in the range from about 0.0 to about 3.5 can be used to dissolve or to disperse the silver nanoparticles, including a hydrocarbon, a heteroatom-containing aromatic compound, an alcohol, and mixtures thereof. Exemplary heteroatom-containing aromatic compounds include chlorobenzene, chlorotoluene, dichlorobenzene, and nitrotoluene. In embodiments, the solvent can be a hydrocarbon solvent containing about 6 carbon atoms to about 28 carbon atoms, such as an aromatic hydrocarbon containing from about 7 to about 18 carbon atoms, a linear or a branched aliphatic hydrocarbon containing from about 8 to about 28 carbon atoms, or a cyclic aliphatic hydrocarbon containing from about 6 to about 28 carbon atoms. In some embodiments, the solvent can be an alcohol, including terpineols such as alpha-terpineol, beta-terpineol, gamma-terpineol, and mixtures thereof.

In some embodiments, the ink vehicle can comprise an aliphatic hydrocarbon, such as a cyclic aliphatic hydrocarbon. The ink vehicle can comprise at least one compound selected from the group consisting of aliphatic hydrocarbons comprising at least one cyclohexane ring such as bicyclohexane, decahydronaphthalene, tetralin, hexylin, cyclic terpenes (including monocyclic monoterpenes such as limonene and selinene), together with bicyclic monoterpene, cyclic terpinene (such as cyclodecene), 1-phenyl-1-cyclohexene, 1-tert-butyl-1-cyclohexene, terpinolene, γ-terpinene, α-terpinene, α-pinene, terpineol, methylnanphthalene, and mixtures thereof. In some embodiments, the ink vehicle can comprise decahydronaphthalene and bicyclohexane.

The ink vehicle can comprise a solvent in certain embodiments. In some embodiments, the conductive ink composition can comprise an ink vehicle that is a solvent or that comprises one or more solvents. The selection of the solvents used in conductive ink compositions can be based on various properties, for example, evaporation rates, boiling points and interaction with other ink components like the stabilized metal-containing nanoparticles. In embodiments, the conductive ink composition can comprise two or more solvents having different evaporation rates. In some embodiments, the conductive ink composition can comprise an ink vehicle comprising one or more solvents having a boiling point of at least 150° C., or from about 150° C. to about 380° C., or from about 180° C. to about 280° C.

The ink vehicle can facilitate the dispersion of the stabilized metal-containing nanoparticles. The ink vehicle can comprise aromatic hydrocarbons such as benzene, toluene, xylene, ethylbenzene, chlorobenzene, chlorotoluene, dichlorobenzene, and nitrotoluene. In some embodiments, the ink vehicle can be decalin and tetralin, an alkane, alkene or an alcohol having from about 10 to about 18 carbon atoms such as, undecane, dodecane, tridecane, tetradecane, hexadecane, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, terpineol (α-terpineol), β-terpineol, 4-terpineol, and the like; isoparaffinic hydrocarbons, such as, for example, isodecane, isododecane, and commercially available mixtures of isoparaffins such as ISOPAR E, ISOPAR G, ISOPAR H, ISOPAR L and ISOPAR M (all the above-mentioned manufactured by Exxon Chemical Company), SHELLSOL (made by Shell Chemical Company), SOLTROL (made by Philips Oil Co., Ltd.), BEGASOL (made by Mobil Petroleum Co., Inc.) and IP Solvent 2835 (made by Idemitsu Petrochemical Co., Ltd.); naphthenic oils; and mixtures thereof. One, two, three or more ink vehicles/solvents can be used.

In embodiments where two or more solvents are used, each solvent can be present at any suitable volume ratio or weight ratio such as for example from about 99 (first solvent):1 (second solvent) to about 1 (first solvent):99 (second solvent), including the volume ratio or weight molar ratio from about 80 (first solvent):20 (second solvent) to about 20 (first solvent):80 (second solvent). For example, the ink vehicle can be a mixture comprised of a solvent selected from the group consisting of terpineol, hexanol, heptanol, cyclohexanol, 3,7-dimethylocta-2,6-dien-1 ol, 2-(2-propyl)-5-methyl-cyclohexane-1-ol, and the like, and at least one solvent selected from the group consisting of decalin, hexadecane, hexadecene, 1,2,4-trimethylbenzene, bicyclohexane and the mixtures thereof.

The ink vehicle (e.g., solvent) can be present in the silver ink composition in an amount of at least 5 weight percent of the composition, such as for example from about 10 weight percent to about 90 weight percent, from about 20 weight percent to about 80 weight percent, from about 30 weight percent to about 70 weight percent and from about 40 weight percent to about 60 weight percent of the composition.

The conductive ink composition can have a surface tension from about 25 mN/m to about 35 mN/m, including from about 28 mN/m to about 32 mN/m. The composition can also have a viscosity from about 2 cps to about 50 cps, including from about 3 cps to about 15 cps.

In embodiments, the ink vehicle(s)/solvent(s) can be present in an amount of from about 5 to about 90 percent by weight of the total weight of the conductive ink composition, including from about 20 to about 80 percent by weight or from about 30 to about 70 percent by weight of the conductive ink composition.

Certain conductive ink compositions can further comprise a resin. The resin can improve adhesion to substrates in some embodiments. The resin can be selected from the group consisting of terpene, styrene block copolymers such as styrene-butadiene-styrene copolymer, styrene-isoprene-styrene copolymer, styrene-ethylene/butylenes-styrene copolymer, and styrene-ethylene/propylene copolymer, ethylene-vinyl acetate copolymers, ethylene-vinyl acetate-maleic anhydride terpolymers, ethylene butyl acrylate copolymer, ethylene-acrylic acid copolymer, polyolefins, polybutene, polyamides, and the like and mixtures thereof. In some embodiments, the conductive ink composition can comprise a polyvinyl alcohol derivative resin. Examples of polyvinyl alcohol derivative resins are polyvinyl butyral resins (PVB) include those resins manufactured under the trade name MOWITAL (Kuraray America), S-LEC (Sekisui Chemical Company), BUTVAR (Solutia, Inc.), and PIOLOFORM (Wacker Chemical Company). In embodiments, the resin can be present in an amount of from about 0.05 to about 5 percent by weight of the total weight of the conductive ink composition. In certain embodiments, the resin can be present in an amount of from about 0.1 to about 3 percent by weight of the total weight of the conductive ink composition.

The fabrication of conductive features, such as an electrically conductive element, from the conductive ink composition can be carried out by depositing the composition on a substrate using any suitable liquid deposition technique at any suitable time prior to or subsequent to the formation of other optional layer or layers on the substrate. Thus, liquid deposition of the conductive ink composition on the substrate can occur either on a substrate or on a substrate already containing layered material, for example, a semiconductor layer and/or an insulating layer.

The phrase "liquid deposition technique" refers to, for example, deposition of a conductive ink composition using a liquid process such as printing or liquid coating, where the liquid is a homogeneous or heterogeneous dispersion of the stabilized metal-containing nanoparticles within a liquid (solvent/ink vehicle). Examples of liquid coating processes include spin coating, blade coating, rod coating, dip coating, and the like. Examples of printing techniques include lithography or offset printing, gravure, flexography, screen printing, stencil printing, inkjet printing, stamping (such as microcontact printing), and the like. Liquid deposition deposits a layer or line of the conductive ink composition having a thickness ranging from about 5 nanometers to about 100 micrometers, such as from about 10 nanometers to about 50 micrometers on the substrate. The deposited conductive ink composition at this stage may or may not exhibit appreciable electrical conductivity.

The substrate upon which the metal (containing silver) features are deposited can be any suitable substrate, including, for example, silicon, glass plate, plastic film, sheet, fabric, or paper. For structurally flexible devices, plastic substrates, such as for example polyester, polycarbonate, polyimide sheets and the like can be used. The thickness of the substrate can be from amount 10 micrometers to over 10 millimeters with an exemplary thickness being from about 50 micrometers to about 2 millimeters for a flexible plastic substrate and from about 0.4 millimeters to about 10 millimeters for a rigid substrate such as glass or silicon.

Heating the deposited conductive ink composition at a temperature of, for example, at or below about 150° C., such as, for example, from about 80° C. to about 150° C., from about 80° C. to about 140° C., from about 80° C. to about 130° C., from about 100° C. to about 120° C. and from about 100° C. to about 110° C. induces the metal-containing nanoparticles to "anneal" and thus forms an electrically conductive layer, which can be suitable for use as an electrically conductive element in electronic devices. The heating temperature can be one that does not cause adverse changes in the properties of previously deposited layer(s) or the substrate (whether single layer substrate or multilayer substrate).

The heating can be performed for a time ranging from, for example, about 1 second to about 100 hours, from about 10 seconds to about 1 hour, and from about 5 minutes to about 30 minutes. The heating can be performed in air, in an inert atmosphere, for example, under nitrogen or argon, or in a reducing atmosphere, for example, under nitrogen containing from about 1 to about 20 percent by volume hydrogen. The heating can also be performed under normal atmospheric pressure or at a reduced pressure of, for example, from about 1000 mbars to about 0.01 mbars.

As used herein, the term "heating" encompasses any technique(s) that can impart sufficient energy to the heated material or substrate to (1) anneal the metal-containing nanoparticles and/or (2) remove the stabilizer from the metal-containing nanoparticles. Examples of heating techniques can include thermal heating (for example, a hot plate, an oven, and a burner), infra-red ("IR") radiation, a laser beam, flash light, microwave radiation, or UV radiation, or a combination thereof.

Heating produces a number of effects. Prior to heating, the layer of the deposited metal-containing nanoparticles can be electrically insulating or with very low electrical conductivity, but heating results in an electrically conductive layer composed of annealed metal-containing nanoparticles, which increases the conductivity. In embodiments, the annealed metal-containing nanoparticles can be coalesced or partially coalesced metal-containing nanoparticles. In embodiments, it can be possible that in the annealed metal-containing nanoparticles, the metal-containing nanoparticles achieve sufficient particle-to-particle contact to form the electrically conductive layer without coalescence.

In embodiments, after heating, the resulting electrically conductive line that has a thickness ranging, for example, from about 5 nanometers to about 5 microns, from about 10 nanometers to about 2 microns, from about 50 nanometers to about 300 nanometers microns, from about 50 nanometers to about 200 nanometers and from about 50 nanometers to about 150 nanometers.

The conductivity of the resulting metal element produced by heating the deposited conductive ink composition can be, for example, more than about 100 Siemens/centimeter ("S/cm"), at least about 1000 S/cm; at least about 2,000 S/cm; at least about 5,000 S/cm; at least about 10,000 S/cm; at least about 30,000 S/cm.; at least 50,000 S/cm.

The resulting elements can be used as electrodes, conductive pads, interconnect, conductive lines, conductive tracks, and the like in electronic devices such as thin film transistors, organic light emitting diodes, RFID (radio frequency identification) tags, photovoltaic, displays, printed antenna and other electronic devices which require conductive elements or components.

The following Examples further define and describe embodiments herein. Unless otherwise indicated, all parts and percentages are by weight.

EXAMPLES

Example 1—Small Scale Preparation of Stabilized Silver Nanoparticles According to Embodiments and Preparation of Silver Nanoparticle Ink Dodecylamine (88.91 g) (as a stabilizer) was heated to 40° C. in a mixture of decalin (30 mL) and methanol (6 mL) in a reaction flask under argon atmosphere until it dissolved. The temperature of the stabilizer (e.g., dodecylamine) solution was reduced to about 30° C. Phenylhydrazine (6.54 g) (as a reducing agent) was added to the cooled stabilizer solution with stirring. Silver acetate (20 g) was then gradually added over 2 hours while the reaction mixture was maintained at a temperature range between 30° C. and 35° C. The color of the reaction mixture changed from clear to dark brown as the silver acetate was added and indicated the formation of silver nanoparticles. After complete addition of the silver acetate, the reaction mixture was heated to 40° C. and stirred at this temperature for one hour.

Crude product was precipitated by adding methanol (100 mL) to the reaction mixture with stirring and the precipitated crude product was collected by filtration. The collected crude product was transferred to a glass beaker and stirred in methanol (50 mL). The final product was collected by filtration and dried in a vacuum oven at room temperature (about 25° C.) for 24 hours, and yielded 13.11 g of dark blue colored silver nanoparticles. The silver content of the final product was about 87.6 weight percent, as measured by ash technique.

A silver nanoparticle ink was prepared from the silver nanoparticles having a silver content of about 87.6 weight percent. Five grams of a silver nanoparticle ink with a 40 weight percent solids content in decalin was prepared as follows: 3 grams of decalin was added to 2 grams of the stabilized silver nanoparticles in a small glass vial and the small glass vial was then gently rolled at room temperature for about 2 hours. The resulting mixture was filtered using a plastic Acrodisc 25 mm syringe filter with a 1 μm glass-fiber membrane and yielded 4.76 grams of a conducting ink with a high filtration yield of about 95 weight percent. The prepared conducting ink contained 35.8 weight percent silver, which was determined by heating a small amount (0.5 g-1.0 g) of the ink at a high temperature (e.g., between 250° C. and 260° C.) to remove all of the stabilizer from the surface of the silver nanoparticles.

The ink prepared as described above was highly conductive. Its conductivity was tested with a spin-coated thin film on a glass substrate from a diluted ink (~20 weight percent). Additional solvent (decalin) was used to dilute the ink prepared as discussed above and a spin-coated thin film was prepared using the diluted ink. The spin-coated film was annealed at 120° C. for about 15 minutes on a hot plate, and yielded a highly conductive silver layer. The thickness of the annealed film was about 92 nm and the conductivity was $3.7 \times 10^4$ S/cm, which was measured using a Keithley Model 236 Source-Measure Unit with 4-probes.

Example 2—Large Scale Preparation of Stabilized Silver Nanoparticles According to Embodiments and Preparation of Silver Nanoparticle Ink A similar synthetic process as described in Example 1 was carried out on a larger scale in a 6-L reaction flask to produce approximately 350 grams of silver nanoparticles. The reaction procedure was carried out by gradually adding silver acetate to a mixture of dodecylamine and phenylhydrazine in a mixed solvent of decalin and methanol in a manner similar to that described in Example 1

The jacket to a 6 liter reactor was set to 50° C. When the temperature of the jacket reached approximately 40° C., 724.4 g decalin was charged into the reactor, followed by 2396.5 g dodecylamine, 176.50 g phenylhydrazine and 176.5 g of methanol. Once all the liquid raw materials were charged, the reactor was cooled down to 35° C. before silver acetate was added. 539.4 g silver acetate was added to the reaction mixture over 2 hours. The reactor temperature was increased to 40° C. to start precipitation. 2133.70 g of methanol was added to the reactor over 25 minutes to isolate the silver nano-particles. After vacuum filtration to remove the mother liquor, the product was re-slurry washed with 534 g of methanol for 30 minutes followed by vacuum filtration to remove excess methanol. The silver content of the silver nanoparticles was 87% (by ASH).

In contrast to the poor solubilities of silver nanoparticles prepared using an existing synthetic process (6-L scale) (Comparative Example 1, below), the silver nanoparticles produced by this process showed excellent dispersibility. The large scale preparation permitted the production of inks having relatively high loads of silver nanoparticles with excellent electronic properties for use in electronic applications based on the amount of silver nanoparticles and silver content in the prepared ink after filtration, which indicated how easily the nanoparticles were dispersed in the solvents.

A silver nanoparticle ink was prepared using the silver nanoparticles (having a silver content of about 87 weight percent) synthesized from the large 6-L scale synthetic process. Ten grams of silver nanoparticle ink with 40 weight percent solid content in decalin was prepared by adding 6 grams of decalin to 4 grams of the silver nanoparticles in a glass bottle. The mixture was soaked for 24 hours and then stirred for 24 hours at room temperature. The resulting mixture was filtered using a plastic Acrodisc 25 mm syringe filter with a 1 μm glass-fiber membrane, and yielded 9.65 grams of a conducting ink with a high filtration yield of 96.5 weight percent. The prepared conducting ink contained 36.4 weight percent silver, which was determined by heating a small amount (0.5 g-1.0 g) of the ink at a high temperature (e.g., between 250° C. and 260° C.) to remove all of the stabilizer from the surface of the silver nanoparticles. The prepared ink was highly conductive with a conductivity of $3.30 \times 10^4$ S/cm, which was measured using a Keithley Model 236 Source-Measure Unit with 4-probes, as in Example 1.

Comparative Example 1—Preparation of Stabilized Silver Nanoparticles According to Existing Methods and Preparation of Silver Nanoparticle Ink Silver nanoparticles were prepared on a large scale (e.g., 6-L scale) using a known synthetic process by gradually adding a reducing agent including phenylhydrazine into a mixture of silver acetate, organoamine stabilizer, and solvents (optional). The resulting silver nanoparticles had very poor dispersibility in decalin and filtered inks prepared with these silver nanoparticles had low silver contents. Good quality silver nanoparticle inks having high silver content could not be produced using the silver nanoparticles produced by this method. All the reagents and solvents, amounts and ink preparation procedures were similar to those described in Example 2.

Two inks (ink A and ink B) were prepared from different batches of dry silver nanoparticles synthesized using an existing synthetic process (gradually adding phenylhydrazine into a mixture of silver acetate and dodecylamine in organic solvents).

Ink A (5 grams) in decalin (40 weight percent solid content loading) was prepared by adding 3 grams of decalin into 2 grams of silver nanoparticles, which were prepared by gradually adding phenylhydrazine into a mixture of silver acetate and dodecylamine in a mixed solvent of decalin and methanol. The resulting mixture was rolled for 2 days and stirred for 24 hours at room temperature. After filtration through a plastic Acrodisc 25 mm syringe filter with a 1 μm glass-fiber membrane, 2.85 grams of ink or 57 weight percent of the unfiltered ink. The silver content of the filtered ink was only 14 weight percent.

Ink B (10 grams) in decalin (40 weight percent solid content loading) was prepared by adding 6 grams of decalin into 4 grams of silver nanoparticles, which were prepared by gradually adding phenylhydrazine into a mixture of silver acetate and dodecylamine in toluene. The mixture was soaked for 24 hours at room temperature and stirred for 24 hours at room temperature and then filtered through a plastic Acrodisc 25 mm syringe filter with a 1 μm glass-fiber membrane. However, only a few drops of the filtered ink were obtained due to the poor dispersibility of the silver nanoparticles. The silver content of the filtered ink was only 6.2 weight percent.

To the extent that the terms "containing," "including," "includes," "having," "has," "with," or variants thereof are used in either the detailed description and the claims, such terms are intended to be inclusive in a manner similar to the term "comprising."

Further, in the discussion and claims herein, the term "about" indicates that the values listed may be somewhat altered, as long as the alteration does not result in nonconformance of the process or structure to the illustrated embodiment.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

It will be appreciated that variants of the above-disclosed and other features and functions, or alternatives thereof, may be combined into many other different systems or applications. Various presently unforeseen or unanticipated alternative, modifications, variations or improvements therein may be subsequently made by those skilled in the art which are also intended to be encompassed by the following claims.

What is claimed is:

1. A conductive ink composition comprising:
a plurality of stabilized metal-containing nanoparticles comprising silver or a silver alloy composite, wherein the silver or silver alloy composite is coated with a stabilizer comprising an organoamine present in an amount ranging from about 3 weight percent to about 60 weight percent including only the stabilized metal-containing nanoparticle and the stabilizer,
at least one ink vehicle comprising an aliphatic hydrocarbon,
two or more solvents having different evaporation rates, and
a mixture of resins comprising terpene, polyvinyl alcohol derivative resins, polybutene, ethylene vinyl acetate-maleic anhydride terpolymers, and at least one other resin comprising styrene block copolymers, ethylene-vinyl acetate copolymers, ethylene butyl acrylate copolymer, ethylene-acrylic acid copolymer, polyolefins, or polyamides, the mixture of resins present in an amount of from about 0.1 to about 3 percent by weight of the total weight of the conductive ink composition,
wherein the plurality of stabilized metal-containing nanoparticles are dispersed in the ink vehicle,
wherein the stabilized metal-containing nanoparticles are prepared by a first method comprising reacting a silver compound with a reducing agent comprising a hydrazine compound by incrementally adding the silver compound to a first mixture comprising the reducing agent, the stabilizer comprising the organoamine, and a solvent,
wherein the ink composition comprises greater than about 15 weight percent silver, and
wherein the two or more solvents comprise
a first solvent selected from the group consisting of terpineol; hexanol; heptanol; cyclohexanol; 3,7-dimethylocta-2,6-dient-1 ol; and 2-(2-propyl)-5-methyl-cyclohexane-1-ol, and
at least one of a second solvent selected from the group decalin; hexadecane; hexadecane; 1,2,4-trimethyl-benzene; bicyclohexane and mixtures thereof.

2. The conductive ink composition of claim 1, wherein the silver compound is added to the first mixture as a dissolved component of a metal-containing solution or as a powder form.

3. The conductive ink composition of claim 1, wherein the stabilized metal-containing nanoparticle further comprises a metal selected from the group consisting of gold, platinum, palladium, copper, cobalt, chromium, nickel, and mixtures of two or more thereof.

4. The conductive ink composition of claim 1, wherein the stabilized metal-containing nanoparticle comprises a silver alloy composite selected from the group consisting of a silver-copper composite, a silver-gold-copper composite, silver-gold-palladium composite, and mixtures of two or more thereof.

5. The conductive ink composition of claim 1, wherein the silver compound comprises a silver salt selected the group consisting of silver acetate, silver trifluoroacetate, silver halide, silver sulfate, silver nitrate, silver hydrocarbylsulfonate, and a mixture of two or more thereof.

6. The conductive ink composition of claim 1, wherein the hydrazine compound is selected from the group consisting of hydrazine or its corresponding salt, a hydrocarbylhydrazine, a hydrocarbylhydrazinium salt, a carbohydrazide, a semicarbazide, a sulfonohydrazide, and a mixture of two or more thereof.

7. The conductive ink composition of claim 1, wherein the organoamine comprises a hydrocarbylamine having at least 4 carbon atoms.

8. The conductive ink composition of claim 1, wherein the organoamine is selected from the group consisting of butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine and mixtures of two or more thereof.

9. The conductive ink composition of claim 1, wherein the mole ratio of the stabilizer to the silver compound is at least about 1:1.

10. The conductive ink composition of claim 1, wherein the reaction of the silver compound with the reducing agent is carried out at a temperature between about 20° C. and about 60° C.

11. The conductive ink composition of claim 1, wherein the reducing agent is a phenylhydrazine and the stabilizer is dodecylamine.

12. The conductive ink composition of claim 1, wherein at a temperature of lower than about 125° C., the stabilized metal-containing nanoparticles form a metal framework with a conductivity of at least $3.0 \times 10^4$ S/cm.

13. The conductive ink composition of claim 1, wherein the organoamine comprises N,N-dimethylamine; N,N-dipropylamine; N,N-dibutylamine; N,N-dipentylamine; N,N-dihexylamine; N,N-diheptylamine; N,Ndioctylamine; N,N-dinonylamine; N,N-didecylamine; N,Ndiundecylamine; N,N-didodecylamine, or mixtures thereof.

14. The conductive ink composition of claim 1, wherein the organoamine comprises 1,2-ethylenediamine; N,N,N',N'-tetramethylethylenediamine; propane-1,3-diamine; N,N,N',N'-tetramethylpropane-1,3-diamine; butane-1,4-diamine; N,N,N',N'-tetramethylbutane-1,4-diamine; and mixtures thereof.

* * * * *